R. HART.
PROCESS OF CALCINING LIMESTONE.
APPLICATION FILED FEB. 17, 1916.
1,179,180.　　　　　　　　　　　　　Patented Apr. 11, 1916.
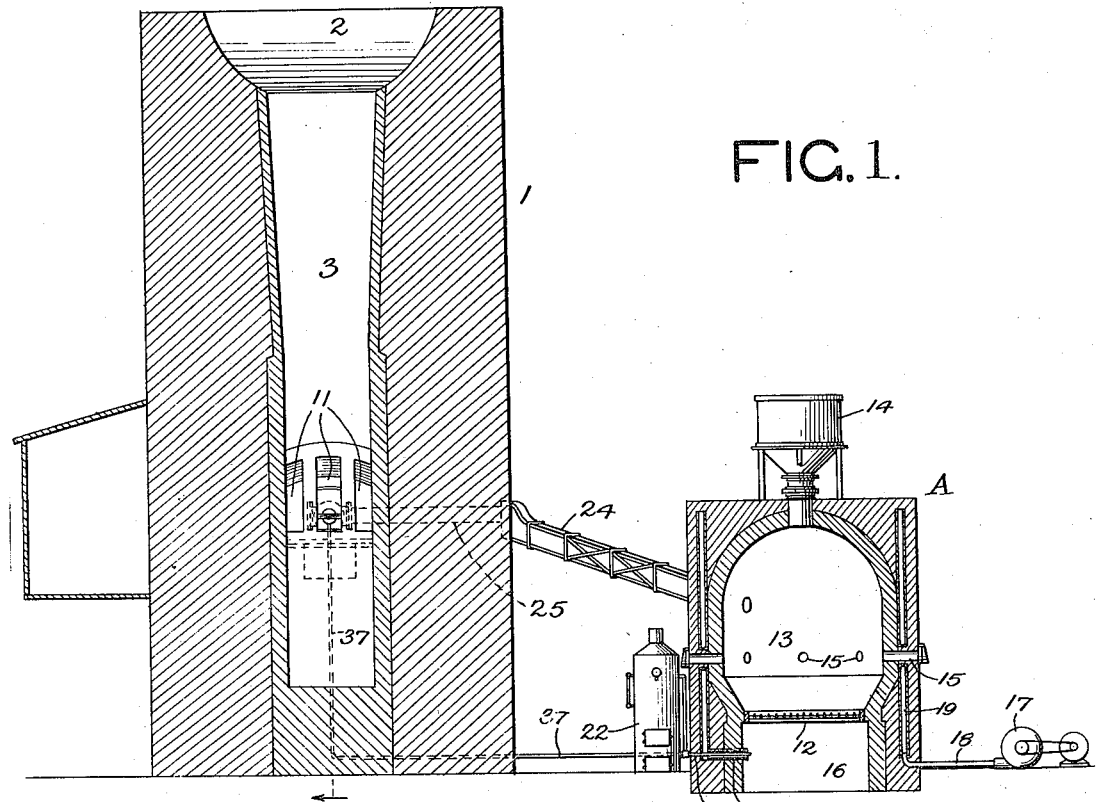
FIG. 1.
FIG. 2.
FIG. 3.
Witness:
J. C. Devich.
Inventor:
Rea Hart.
Miller Chindahl & Parker
Attys.
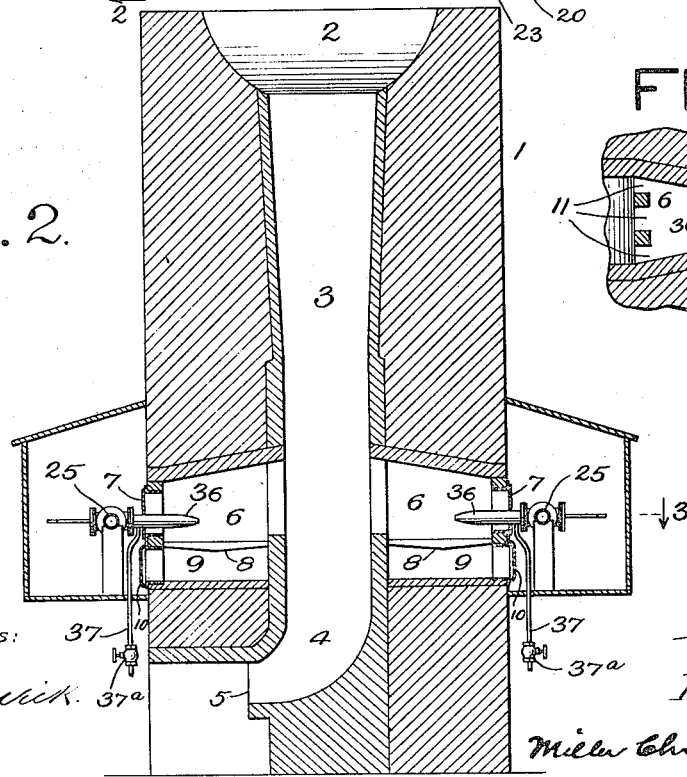

UNITED STATES PATENT OFFICE.

REA HART, OF ROCKFORD, ILLINOIS, ASSIGNOR TO REA HART AND BAILEY B. PAGE, COPARTNERS DOING BUSINESS AS HART & PAGE, OF ROCKFORD, ILLINOIS.

PROCESS OF CALCINING LIMESTONE.

1,179,180.            Specification of Letters Patent.     Patented Apr. 11, 1916.

Continuation in part of application Serial No. 20,146, filed April 9, 1915. This application filed February 17, 1916. Serial No. 78,892.

*To all whom it may concern:*

Be it known that I, REA HART, a citizen of the United States, residing at Rockford, in the county of Winnebago and State of Illinois, have invented a certain new and useful Process of Calcining Limestone, of which the following is a specification.

This application is a continuation in part of my copending application Serial No. 20,146, filed April 9, 1915.

To obtain a high-grade product, the calcination of the limestone must be controlled and varied with due regard to the character of the stone. If the limestone be substantially pure calcium carbonate, the process of calcining the stone is simple and safe, as there is no danger of overburning. If the limestone contains a greater or less amount of magnesia, the calcination of the limestone requires careful control in order that the limestone shall not be overburned.

Because of its abundance and cheapness, wood has, in the past, been used almost universally as fuel in burning limestone. While many efforts have been made to use coal and producer gas in the manufacture of lime, wood has remained the favorite notwithstanding its rapidly increasing cost and growing scarcity, for the reason that when wood is used as the fuel there is little or no danger of overburning the limestone, whereas coal and producer gas as heretofore applied have not been sufficiently controllable to prevent overburning of magnesian limestone.

The object of this invention is to provide a process whereby gas may be practically used in the production of high-grade lime, even where the limestone contains considerable amounts of magnesia. The process consists in calcining the stone with a combustible gas which has been so greatly diluted with steam that a very long and comparatively cool flame is produced, simulating in its effects the flame produced in the burning of wood in a lime kiln.

The nature of the invention will be more fully understood from a consideration of the following description and the accompanying drawings, in which drawings—

Figure 1 is a view (more or less diagrammatic) illustrating an apparatus which may be used in practising my invention. Fig. 2 is a vertical central sectional view through the lime kiln, taken in the plane of dotted line 2 of Fig. 1. Fig. 3 is a fragmental horizontal sectional view taken in the plane of dotted line 3 of Fig. 2.

The small-unit wood-burning kilns such as are now in use in most lime-producing plants, having an inside diameter of five or six feet and a height of from twenty-four to forty feet, are the best suited of all types for the production of good lime from stone containing magnesia and impurities. I therefore have herein illustrated such a kiln.

In the drawings, 1 denotes a kiln of common construction, said kiln comprising the hopper 2, the central shaft 3, the cooler 4, the draw-off opening 5 and two oppositely arranged combustion chambers 6.

7 are the furnace doors, 8 the grates, 9 the ashpit, 10 the ashpit door, and 11 (Fig. 3) openings communicating between the combustion chambers and the shaft 3. The kiln is open at its top in order that the carbon dioxid may escape freely and rapidly.

The gas to be burned in the chambers 6 may be produced in a gas producer A of any suitable character. Herein I have shown a gas producer comprising a grate 12, a chamber 13 to contain a bed of fuel of suitable depth, a charging hopper 14, poke holes 15, and an ashpit 16. Air under pressure is supplied to the fuel by means of a fan or blower 17 of any suitable type. The outlet of the fan or blower is connected by a pipe 18 to an annular air-heating chamber 19 contained within the walls of the gas producer, said chamber communicating with the space below the grate 12 through a passage 20.

Steam is supplied under pressure to the gas producer by suitable means, as, for example, an ordinary steam boiler 22. A pipe 23 extends from the steam space in the boiler to the space below the grate. Preferably, although not necessarily, the discharge end of the steam pipe 23 is located within the air passage 20, so that the entering steam and air shall be intimately mixed. Part of the steam is dissociated in the gas producer, the remainder serving to dilute the gas.

The moisture also assists in the liberation of carbon dioxid from the stone.

I have found it desirable to supply sufficient steam through the pipe 23 so that a very wet producer gas is obtained of the Mond type. As the process has been practised by me, sufficient steam is admitted through the pipe 23 so that the gaseous mixture leaving the gas producer contains on the average about 14% of steam by volume.

The gas produced in the chamber 13 may be conducted to the kiln in any suitable manner, as by means of conduits 24 and pipes 25. As shown in my said application Serial No. 20,146, a conduit 24 and a pipe 25 may be provided for each furnace, each pipe 25 extending to a point in front of one of the furnaces of the kiln.

The valve by means of which the supply of gas to the burner is controlled, may be of any suitable construction, that herein shown consisting of a circular valve member 38.

The burner 36 may be of any preferred construction. It projects through an opening in the furnace door 7 and extends to a suitable point within the combustion chamber 6. Preferably the burner is of such size as to produce a large flame. A burner of eight-inch diameter, in connection with a kiln of dimensions given has given good results. The shape of the orifice is such that the gas leaves the burner under relatively small pressure.

The size of the burner and its location within the combustion chamber depend upon the size of the furnace and perhaps other factors. The burner should be far enough away from the openings 11 so that the flame may spread out and not be concentrated upon a relatively small part of the charge, as such a concentrated flame tends to overheat and discolor the lime.

As hereinbefore stated, the gaseous mixture leaving the producer A contains a relatively large percentage of steam. Still further to dilute the mixture I provide a pipe 37 communicating with the boiler 22 and arranged to discharge steam into the burner 36. As practised by me, sufficient steam is admitted through the pipe 37 to bring the total amount of steam in the hot combustible mixture supplied to the burner up to an average of about 30% by volume.

The percentage of steam in the combustible mixture supplied to the burners will vary slightly at times, due to variations in operating conditions. If desired, substantially all of the steam might be supplied through the pipe 37, although, for the sake of convenience in operating the gas producer, it is preferable to supply so much steam to the producer that a very wet producer gas will be made, regulation of the amount of steam in the combustible mixture (and consequently the temperature in the kiln) being effected by adjusting the flow of steam through the pipe 37 by means of a valve 37$^a$.

Air to support combustion enters the kiln through the draw-off opening 5 and also through the ashpits 9. In practice, it often happens that the doors 7 or the frames upon which they are hung do not fit tightly, so that more or less air enters through the front end of the combustion chamber.

In practice, the supply of air and steam to the gas producer is regulated in accordance with the particular material being burned. In calcining limestone containing magnesia, I prefer to use a relatively cool flame rolling up from the burner and spreading out within the combustion chamber, and thence passing through the spaces 11 and upwardly within the shaft 3.

The gas discharged from the burner takes air for combustion from the space surrounding the burner, mixing slowly with this air by reason of the velocity of the gas and the draft through the kiln, the result being that a long flame is produced. The large amount of steam flowing with the gas passes into the combustion zone and reduces the temperature there by reason of its high specific heat and decomposition into its elements. These elements may again unite farther up in the kiln with the production of heat and thus extend the combustion zone.

While the analysis of the mixture supplied to the burners will vary at times, an average analysis of the mixture is approximately as follows:

| | By volume. |
|---|---|
| $CO_2$ | .091 |
| $CO$ | .056 |
| $CH_4$ | .042 |
| $H_2$ | .126 |
| $N_2$ | .385 |
| $H_2O$ | .300 |

Percentages by volume have been stated on the basis of the space each constituent of the mixture would occupy separately at the same pressure and temperature.

It has been proposed to slightly dilute producer gas with carbon dioxid drawn from the shaft, but this has not proved successful, for the reason that the carbon dioxid reunites with the lime or partially calcined stone, the quality of the product being thereby impaired, and for the further reason that the producer gas is not sufficiently diluted.

By means of the valves 38 the amount of gas supplied to the kiln furnaces may be regulated in the manner necessary to heat the kiln uniformly, notwithstanding the direction of the wind, peculiarities in the construction of the particular kiln, and other factors tending to prevent uniform distribution of the heat.

It will be seen that no attempt is made to remove the tar and other heavy products of the distillation and decomposition of the coal, all of such products which reach the burner being consumed.

I claim as my invention:

1. The process of calcining limestone comprising producing a wet combustible gas, mixing steam with said gas, and burning the combined steam and gas in contact with a charge of limestone.

2. The process of calcining limestone comprising producing a wet combustible gas, mixing sufficient steam with the gas to make the total amount of steam approximately 30% by volume, and burning the combined steam and gas in contact with a charge of limestone.

3. The process of calcining limestone comprising first obtaining a wet producer gas of the Mond type, mixing steam with said gas, and burning the combined steam and gas in contact with a charge of limestone.

In testimony whereof, I hereunto set my hand.

REA HART.

In the presence of—
HARRY B. NORTH,
ARTHUR E. FISHER.